United States Patent
Raffoni

(10) Patent No.: US 6,651,859 B2
(45) Date of Patent: Nov. 25, 2003

(54) DEVICE FOR MATING STRIPS JOINED AT AN ANGLE FOR FORMING RECTANGULAR FRAMES

(76) Inventor: Giuseppe Raffoni, Viale D. Bolognesi, 24, 47100 Forli' (IT)

( * ) Notice: Subject to any disclaimer, the term of this patent is extended or adjusted under 35 U.S.C. 154(b) by 164 days.

(21) Appl. No.: 09/804,630

(22) Filed: Mar. 12, 2001

(65) Prior Publication Data

US 2001/0022314 A1 Sep. 20, 2001

(30) Foreign Application Priority Data

Mar. 17, 2000 (IT) ..................................... FO2000A0005

(51) Int. Cl.$^7$ ................................................. B27F 7/00
(52) U.S. Cl. ........................ 227/40; 227/100; 227/152; 227/148
(58) Field of Search ................ 227/40, 100, 154, 227/151, 152, 148

(56) References Cited

U.S. PATENT DOCUMENTS

| | | | | |
|---|---|---|---|---|
| 2,944,262 A | * | 7/1960 | Richman et al. | ............... 72/325 |
| 4,126,259 A | * | 11/1978 | Galer et al. | .................... 227/30 |
| 4,127,226 A | * | 11/1978 | Jasper | .......................... 227/69 |
| 4,258,873 A | | 3/1981 | Vela | |
| 4,288,016 A | * | 9/1981 | Failla et al. | .................... 227/30 |
| 4,587,791 A | * | 5/1986 | Brouse et al. | ............. 53/139.6 |
| 4,670,957 A | * | 6/1987 | Wolford | .................... 29/243.5 |
| 4,709,494 A | * | 12/1987 | Kennedy et al. | ............... 40/783 |
| 4,893,493 A | * | 1/1990 | Jacques et al. | ................ 72/325 |
| 4,989,438 A | * | 2/1991 | Simon | .......................... 72/325 |
| 5,040,400 A | * | 8/1991 | Nastasi | ........................ 72/325 |
| 5,423,118 A | * | 6/1995 | Lotti | ........................... 29/809 |
| 6,089,434 A | * | 7/2000 | Gleason | ......................... 227/3 |

FOREIGN PATENT DOCUMENTS

| | | | | |
|---|---|---|---|---|
| DE | 2747314 A1 | * | 4/1979 | ............ B27M/3/00 |
| GB | 1 455 773 | | 11/1976 | |
| WO | 82 00323 | | 2/1982 | |

* cited by examiner

Primary Examiner—Stephen F. Gerrity
Assistant Examiner—Louis Tran
(74) Attorney, Agent, or Firm—Guido Modiano; Albert Josif; Daniel J. O'Byrne

(57) ABSTRACT

A device for mating strips joined at an angle for forming rectangular frames having a L-shaped element, acting as movable abutment for the strips, has a symmetrical hinged connection to a pair of linkages, pivotally connected to a free end to the supporting element fixed to the platform, and an arm protruding outside the L-shaped element along the extension of its bisecting line and undergoing elastic centering. The element and linkages are accommodated in the supporting element in two mutually aligned seats which lie transversely to the slot of the platform, and are each constituted by a bush from which a slider protrudes; the slider is pushed, until it rests against an abutment of the bush, by a cylindrical spring which acts between the slider and the screw-type cap used also to adjust the preloading of the spring.

6 Claims, 7 Drawing Sheets

US 6,651,859 B2

DEVICE FOR MATING STRIPS JOINED AT AN ANGLE FOR FORMING RECTANGULAR FRAMES

BACKGROUND OF THE INVENTION

The industrial production of wooden frames, and particularly of rectangular frames for paintings, photographs, mirrors and others, already uses automatic assembling machines which, starting from four strips cut at 45° at both ends, pick up the strips and place them to join in pairs, at an angle, and be coupled by way of appropriate generally V-shaped steel staples which are inserted pneumatically astride the joining lines.

However, mostly due to the incorrect length of some of the strips, the joints are sometimes imperfect because the ends of the strips arranged adjacent at an angle fail to mutually coincide so to form the corners of the frame.

SUMMARY OF THE INVENTION

The aim of the present invention is to ensure in any circumstance, in machines that form rectangular frames, that the ends of the strips automatically coincide perfectly in all angled joints even if their length is imperfect.

This aim has been fully achieved with a particular device which can be used on various machines, already used to form rectangular frames. For the purpose of merely showing its operation and advantages, said device is shown installed, in the accompanying drawings, in a machine devised by the same Applicant and disclosed in U.S. Ser. No. 09/546,435 of Apr. 10, 2000.

Indeed to facilitate reference to the above patent and aid comprehension of the improved machine as a whole, in the accompanying drawings the same reference numerals are used to designate corresponding parts or elements.

BRIEF DESCRIPTION OF THE DRAWINGS

The present drawings, provided merely by way of non-limitative example, comprise.

DESCRIPTION OF THE PREFERRED EMBODIMENTS

Figure 1:
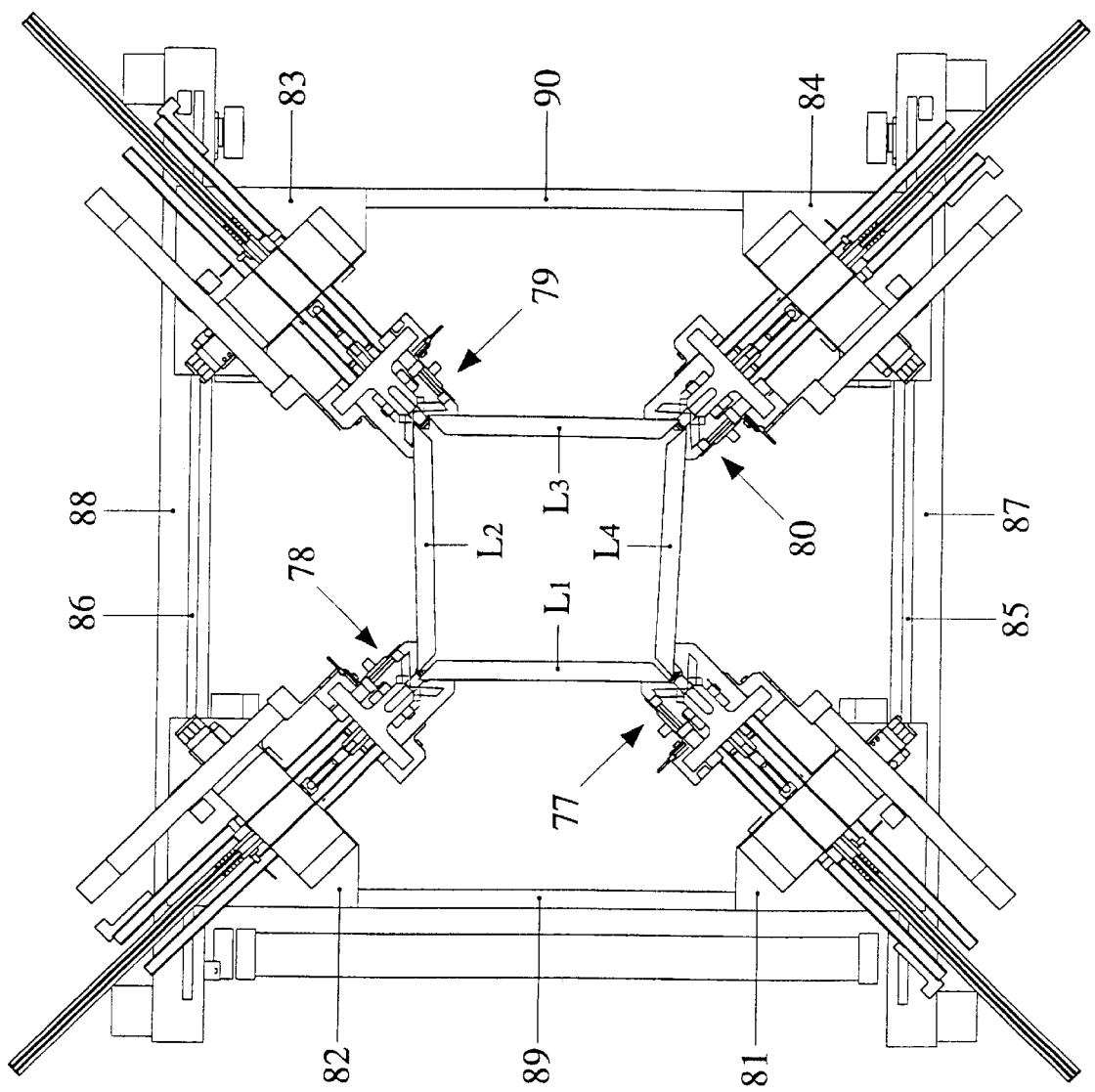
FIG. 1, which is a schematic plan view of the four staplers that compose the machine.

According to what is shown schematically in the top view of FIG. 1 but is described more extensively in U.S. Ser. No. 09/546,435, the machine for forming rectangular frames uses the simultaneous intervention of four staplers (77–78–79–80) which are all identical and are installed in a corresponding number of corner plates (81–82–83–84).

The pairs of plates 81–82 and 83–84 slide on the two mutually parallel rails 85 and 86, which are fixed on the beams 87 and 88 being rigidly coupled to the frame of the machine; the first pair is rigidly connected by the cross-member 89 and the second pair is rigidly connected by the cross-member 90.

Each stapler (FIGS. 2 and 3) comprises a support 91, being composed of a base 92 fixed diagonally on one of the corner plates (81–82–83–84), from which two shoulders 93 rise; said shoulders are connected at the top by the bridge 94 and form the passage for the two rails 95, being slidingly guided in the supports 96 which are fixed under said bridge 94 and are fixed on the triangular bracket 97 to which the pneumatic cylinder 98 is coupled by means of a flange in the underlying face; the cylinder 98 is designed to expel the staples for fixing the strips L1–L2–L3–L4 (FIG. 1) that compose the frame.

In known staplers, said staples or other equivalent fixing elements, which arrive from a magazine, which is almost always located between the rails 95, are in fact conveyed above a punch which is propelled upward by the cylinder 98 so as to pass through a slot in the apex region of the bracket 97 in order to insert the staples or other elements astride the joining line of two strips arranged at 90°.

The platform 102 slides on the rails 95 and is fixed to a pair of carriages 103; the ends of the two strips to be joined at an angle will rest on said platform 102, and the slot 104, which lies parallel to the rails 95 and allows to fix the staples or other joining means to be inserted from below into the strips of the frame, is formed in said platform.

The bracket 97 is crossed, on the two sides of the movable platform 102, by the stems 105 of two vertical cylinders 107 which are fixed under said bracket. The cross-member 106 is fixed to the top of the stems 105 and has, in its front part, a presser 110 which is L-shaped and adjustable along the slot 109 and is designed to clamp the strips against the platform 102 when the punch of the cylinder 98 acts from below against said strips through the slot 104 in order to insert therein the staples or other equivalent joining means.

Figure 4:
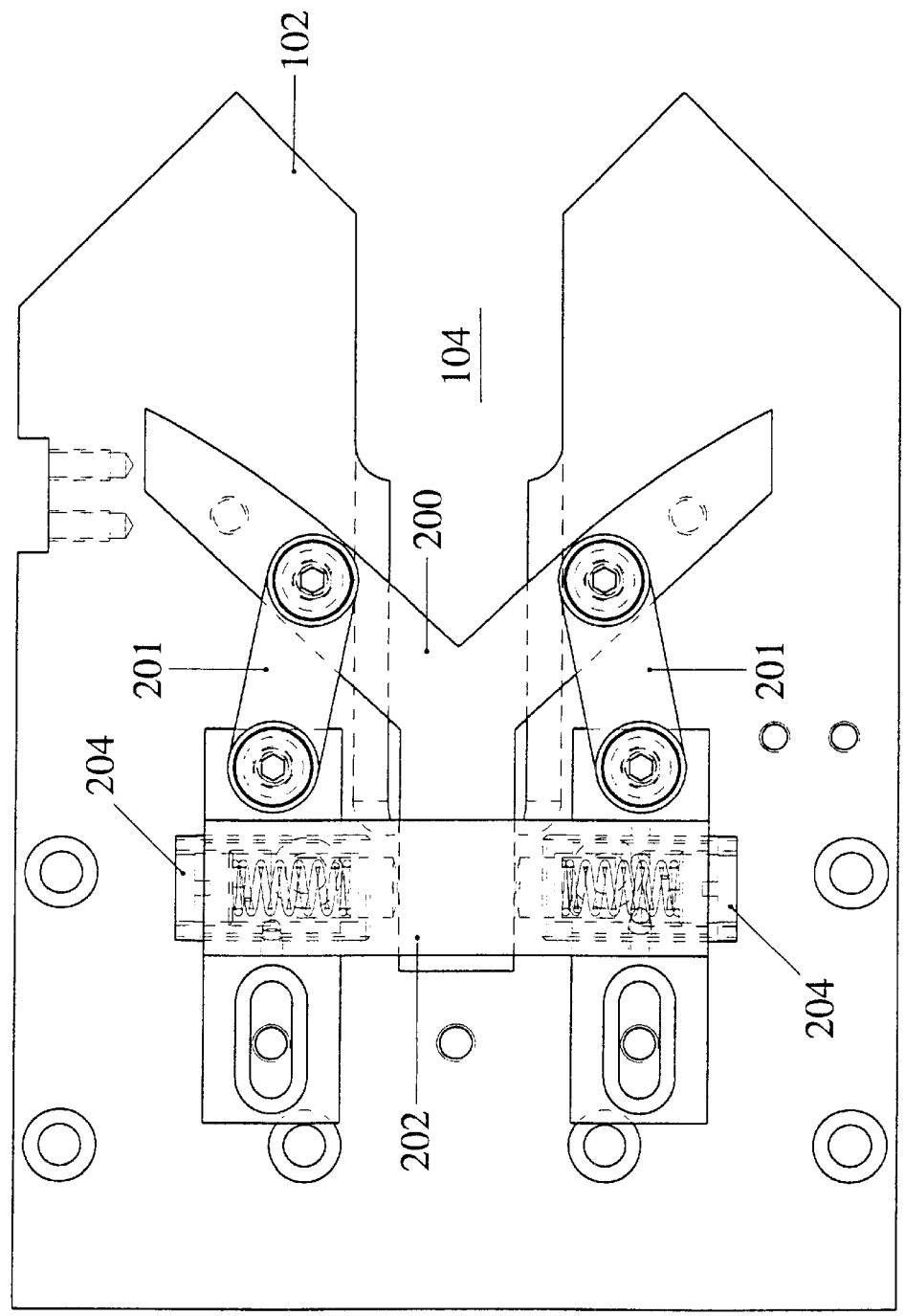
FIGS. 4 and 5, which are a top view and an exploded perspective view, respectively, of the part of the stapler equipped with the device according to the invention.
Figure 5:
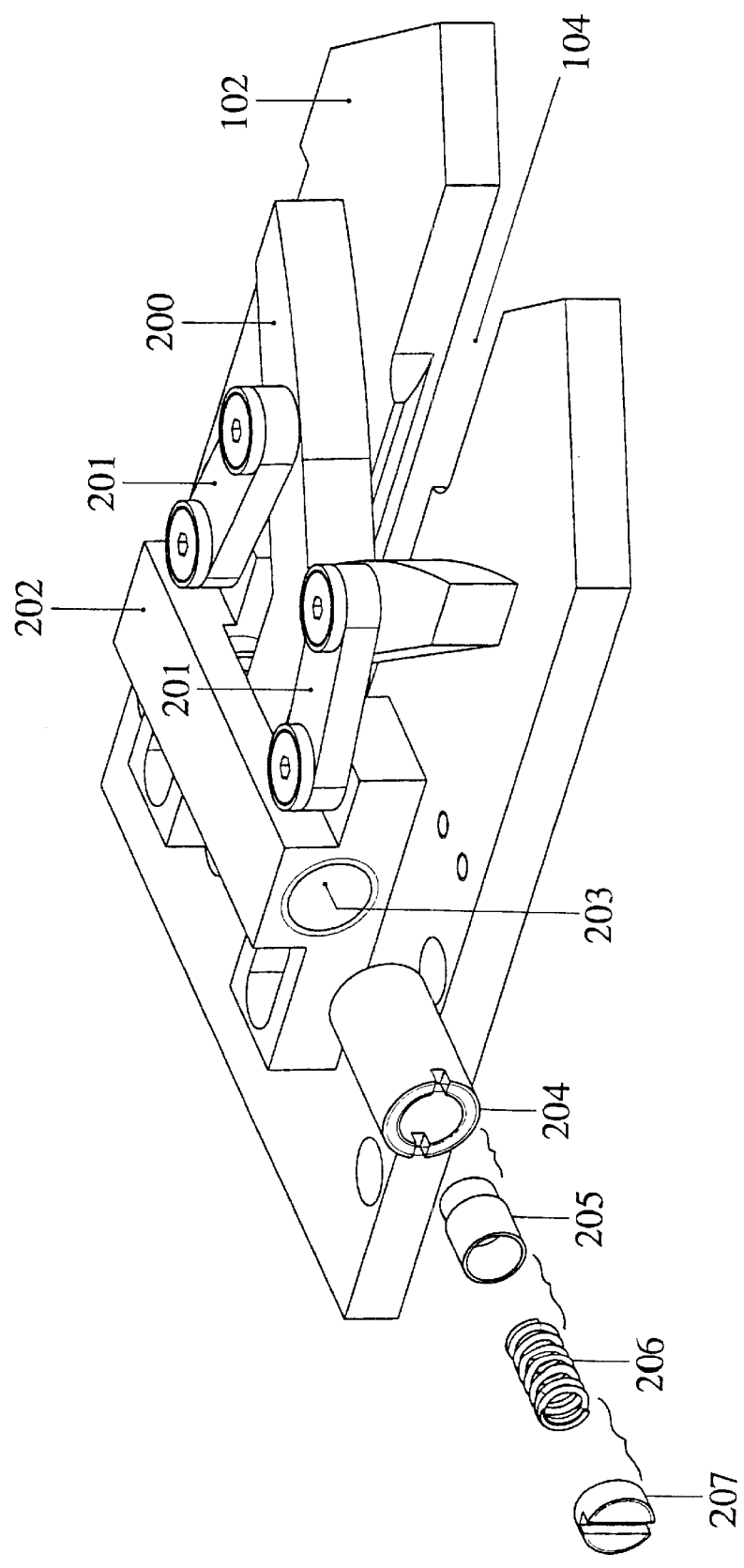

Differently from the machine described in U.S. Ser. No. 09/546,435, in which the mating, at an angle, of each pair of strips occurs by way of two abutments, which are rigidly fixed on the platform 102 so as to form a right angle whose bisecting line is stably the slot 104, according to the present invention this task is performed, with results being qualitatively better, especially in case of imperfections in the length of the strips, by a device which is visible in all the figures of the accompanying drawings but is shown in detail in FIGS. 4, 5 and 6 together with the platform 102 alone, on which it is fitted.

As shown by the above cited figures, the device according to the invention is generally designed to provide a sort of oscillating L-shaped element able to automatically and elastically adapt to the two strips during their mating at an angle, so as to form one of the corners of the frame, until their ends coincide perfectly.

For this purpose, the L-shaped element 200 is composed of two abutments arranged at 90° and comprises an arm which protrudes from the vertex of the L-shaped element along the bisecting line, so as to form a sort of Y-shaped arrangement. The two abutments that form the L-shaped element are articulately connected, by way of respective linkages 201, to a supporting element 202 which is fixed on the platform 102. The arm of the L-shaped element 200 lies between two appropriately provided elastic centering elements which act equally and oppositely on opposite sides of said arm.

Said elements, which are accommodated in the supporting element 202 in two mutually aligned seats 203 lying transversely to the slot 104 of the platform, are each constituted by a bush 204 from which a slider 205 protrudes; said slider is pushed, so as to rest against an abutment of the bush, by a cylindrical spring 206 which acts between said slider and the screw-type cap 207 which is also used to adjust the preloading of the spring. The described element, without altering the other parts, might also be provided without the bush 204, whose presence instead allows to appropriately adjust, in each instance and by screwing, the extent of protrusion of the corresponding slider 205 into the recess, provided under the element 202, in order to accommodate the rear arm of the L-shaped element 200 and the movements thereof caused by the deformation of the articulated parallelogram formed by the connection of the L-shaped element 200 to the element 202 by way of the two linkages 201.

Figure 2:
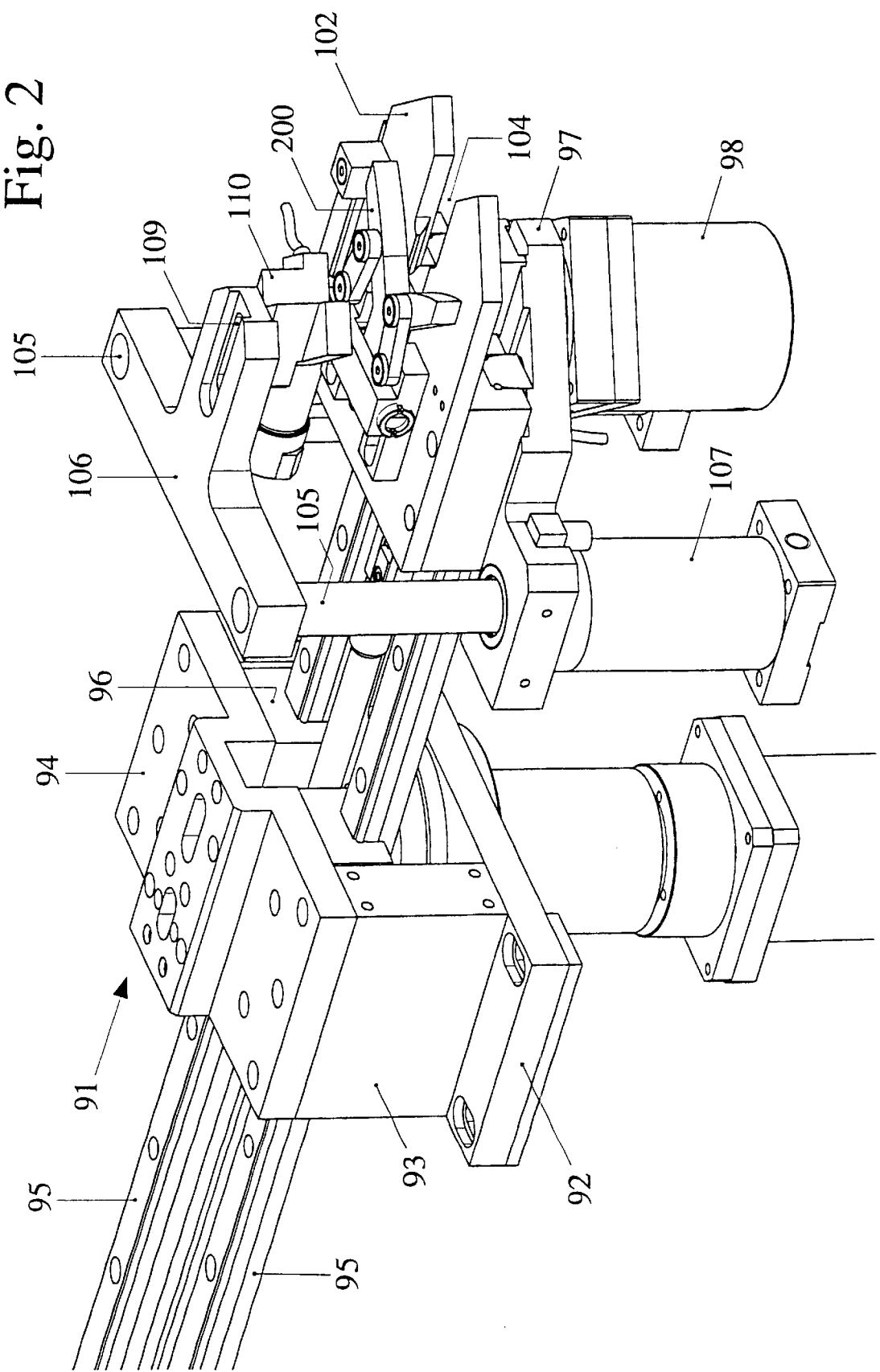
FIGS. 2 and 3, which are perspective views of one of the four staplers, shown both in the retracted position, for positioning the strips, and in the advanced position for applying the staples.
Figure 3:
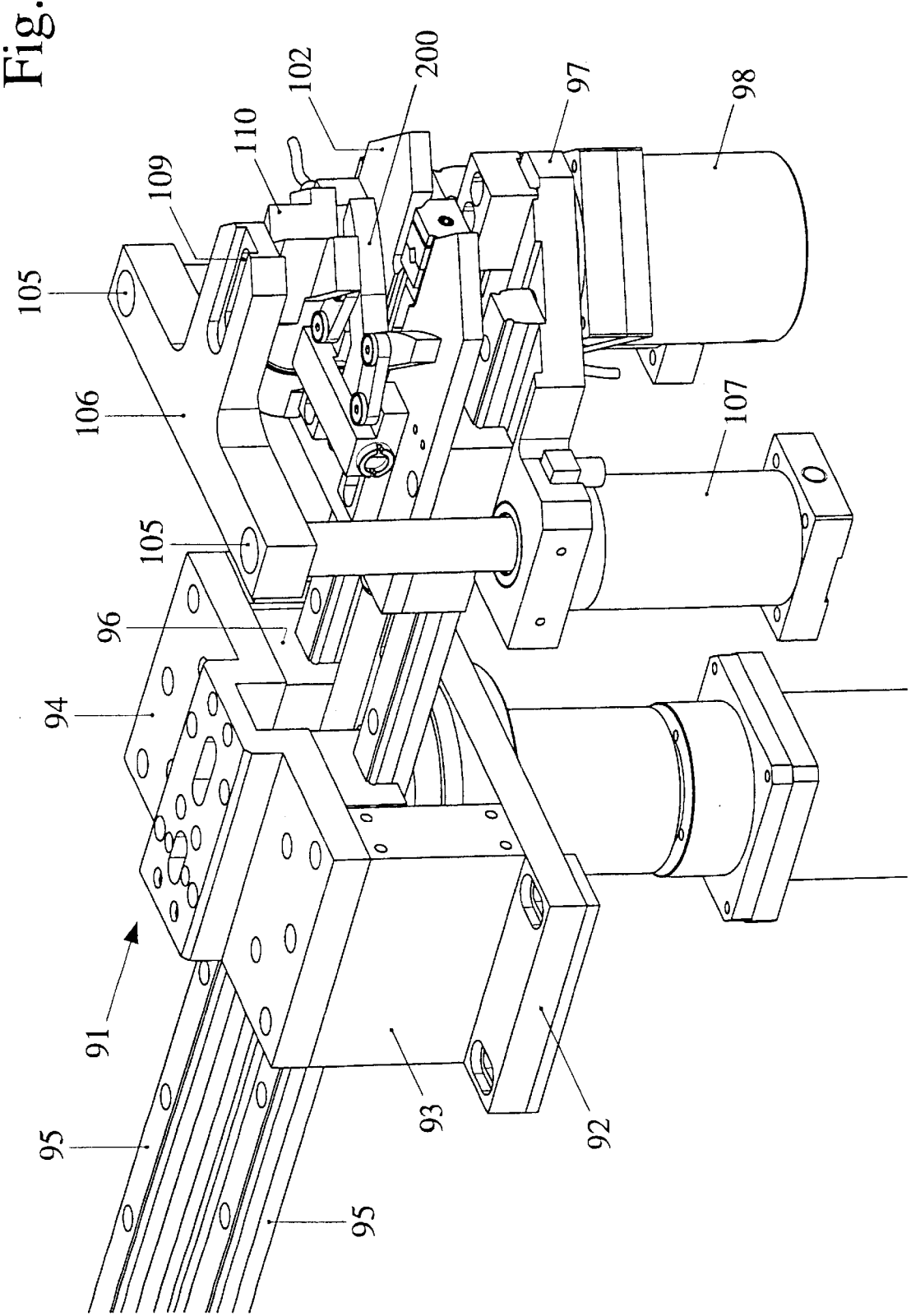
Figure 6:
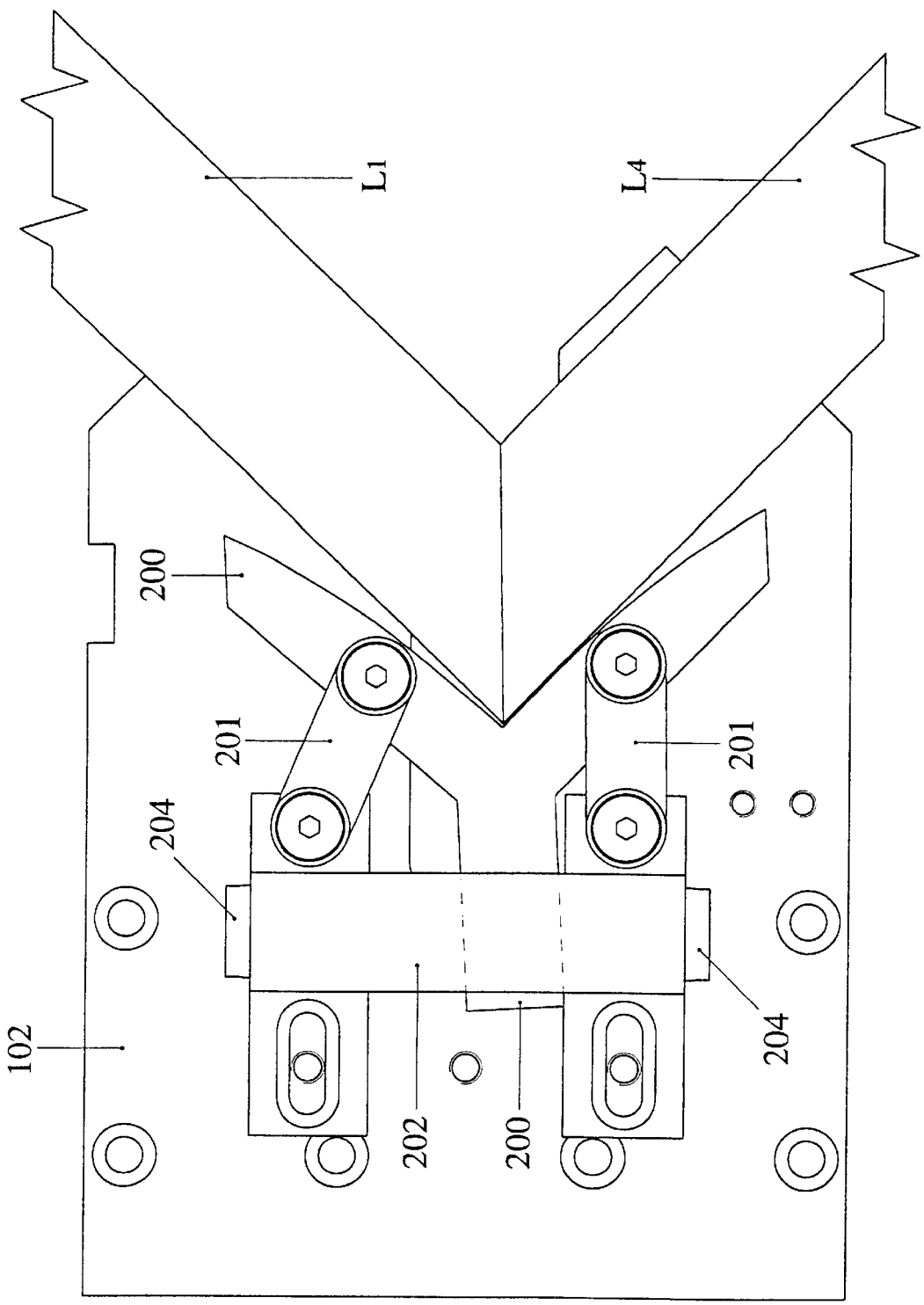
FIG. 6, which is a top view illustrating the operation of the device according to the invention, while performing the perfect mating of the two strips to be joined at an angle.

After resting the four strips L on the platforms 102 of the four staplers (FIG. 1), said staplers advance simultaneously along the rails 95 and move from the configuration of FIG. 2 to the configuration of FIG. 3, since the platforms 102 are retained by the abutment of the respective L-shaped elements 200 against the two strips L to be joined at an angle (FIG. 6). This occurs, as shown and described in U.S. Ser. No. 09/546,435, in contrast with appropriately provided return springs, which are further compressed when the joining operation requires two or more staples to be applied individually in succession.

If the L-shaped abutment elements were fixed as in the prior art, any error in the length of the strips would inevitably be rendered evident by the incorrect placement of the two ends that form each corner; instead, thanks to the possibility to vary its position in the described manner, each L-shaped element elastically adapts to both strips that arrive thereat, until their ends coincide. In other words, the mobility of the L-shaped abutment elements allows to obtain frames with perfectly formed corners, since their geometric arrangement is not rigidly preset in the machine but is freely determined by the assembly of said strips.

Figure 7:
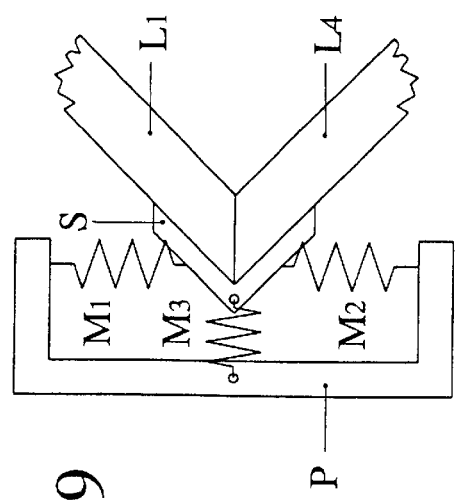
FIGS. 7, 8, 9, 10, and 11, which are schematic top views of some further embodiments that can be provided within the scope of the same inventive idea.

It is evident that in addition to the already described example and within the scope of the same inventive idea, the invention allows a wide range of further possible embodiments, some of which, five in the specific case, are shown in the accompanying FIG. 7 by a corresponding number of top views which schematically illustrate the refinements whereby each L-shaped element S can elastically vary its position as it encounters the strips L1 and L4 to be joined at an angle.

Figure 8:
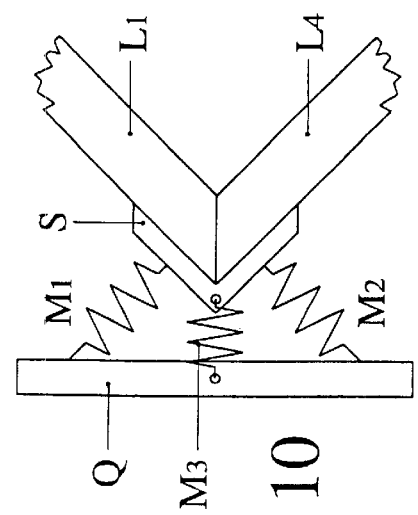

With reference to these figures and according to the embodiments of FIGS. 7 and 8, the L-shaped element S, pivotally coupled in one end of the linkage or link B whose other end is pivotally coupled in the supporting element P or Q fixed to the platform 102 of the stapler, tends to retain a centered position, i.e., with the two linkage hinges arranged along the extension of its bisecting line, undergoing for this purpose the opposite action of two identical springs M1 and M2 which, in conditions of perfect balance, can be mutually aligned as in the embodiment of FIG. 7, or can be oblique as in the version of FIG. 8.

In both of said embodiments, the movement of the L-shaped element S, regardless of the involvement or not of the linkage 8 in modifying its position, occurs by increasing traction in one of the two springs and reducing it in the other spring, or, with another type of spring, by increasing the compression of one and reducing the compression of the other.

Figure 9:
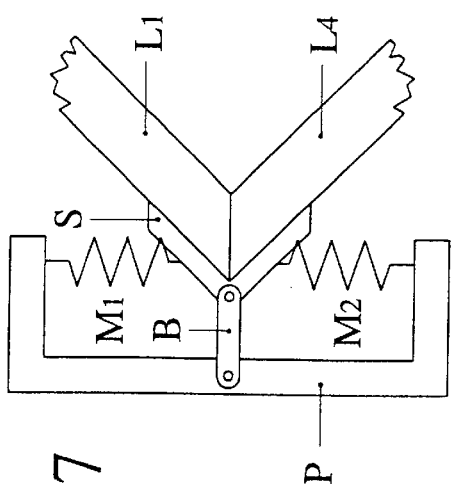
Figure 10:
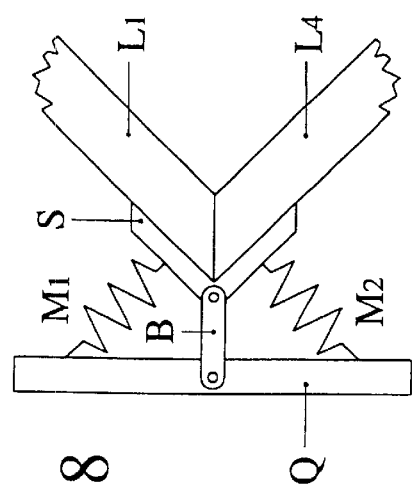

The embodiments of FIGS. 9 and 10 differ from the embodiments of FIGS. 7 and 8 only in the replacement of the linkage or link B with the spring M3, which by being coupled to the L-shaped element S and to the fixed element P or Q where the linkage was pivoted, acts substantially by compression and has to contrast the translatory movements of the L-shaped element S along the extension of its bisecting line.

The springs M1 and M2, in fact, react to the lateral movements of the L-shaped element S with a behavior which is similar to the one already described for the embodiments of FIGS. 7 and 8.

Figure 11:
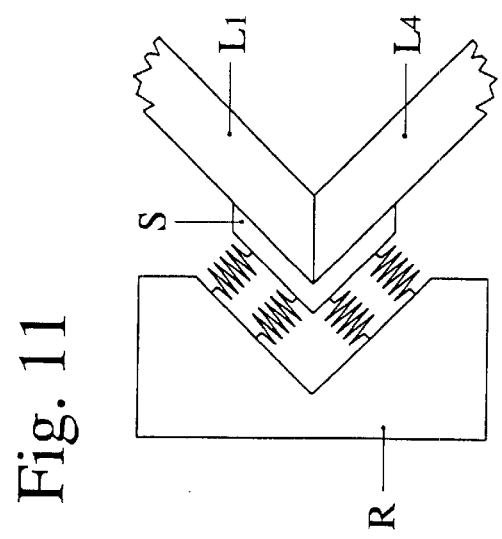

According to the embodiment of FIG. 11, the element R, which is fixed on the platform 102 of the machine, is also L-shaped in order to accommodate two series of springs, one for each side, which adapt in all directions to the movement of the L-shaped element S, rigidly coupled to the element R, only by way of said springs.

The two series of springs interposed so as to connect the L-shaped element S to the fixed element R might also be replaced with a support made of rubber-like or otherwise flexible material.

To conclude, differently from the L-shaped elements or other similar fixed abutments provided in known machines that form rectangular frames and borders, the L-shaped element of the device according to the invention, coupled elastically in any way, is not designed to determine the angle of the strips that converge thereat, but only the point where their ends meet, and therefore instead of being right-angled it is preferably shaped as an obtuse angle, so as to avoid hindering any of the angular adaptations that said frame being formed must be free to perform autonomously before the staples are applied, if there are differences in length in one or both of the pairs of parallel strips that form it.

Finally, it should be added that the device according to the invention, without altering the general characteristics that have been illustrated and described, is susceptible to further modifications and variations, which are in any case within the scope of the appended claims and might become necessary especially in application to machines other than the one that has been illustrated and described by way of example.

The disclosures in Italian Patent Application No. FO2000A000005 from which this application claims priority are incorporated herein by reference.

What is claimed is:

1. In a machine for forming rectangular frames composed of strips, each strip being a member of two pair of strips, each such pair forming, at abutting ends of said strips, corners of said frame, assembled by way of connecting elements inserted transversely by staplers on the joints formed by mating at right angles said abutting ends of said strips, said staplers being arranged diagonally opposite each other at platforms of the machine for supporting the ends of the strips that form the corners of the frame, a strip mating device comprising: two abutments supported at each one of said platforms to arrange at right angles any of said pair of strips, said abutments forming an L-shaped element which is supported at the respective platform in an oscillatable manner and forms an angle adapted to receive and arrange at 90° the ends of each pair of strips; and elastic contrast means for elastically contrasting oscillation of and retain said L-shaped element in a position in which said strips form said rectangular frame, said machine, further comprising a supporting element which is fixed on said platform so as to form an articulated parallelogram; linkages for connecting to said supporting element said abutments of each L-shaped element, said L-shaped element having an arm which is arranged so as to form a Y-shaped configuration with said L-shaped element, said elastic contrast means including two contrast elements acting elastically in an equal and opposite manner on opposite sides of said arm which lies therebetween.

2. The device of claim 1, wherein said contrast elements are accommodated in respective seats of said supporting element which are aligned transversely with said arm, each one of said contrast elements being constituted by a slider which is guided in a respective one of said seats, and by a cylindrical spring which actuates said slider into abutment against said arm.

3. In a machine for forming rectangular frames composed of strips, each strip being a member of two pair of strips, each such pair forming, at abutting ends of said strips, corners of said frame, assembled by way of connecting elements inserted transversely by staplers on the joints formed by mating at right angles said abutting ends of said strips, said staplers being arranged diagonally opposite each other at platforms of the machine for supporting the ends of the strips that form the corners of the frame, a strip mating device comprising: two abutments supported at each one of said platforms to arrange at right angles any of said pair of strips, said abutments forming an L-shaped element which is supported at the respective platform in an oscillatable manner and forms an angle adapted to receive and arrange at 90° the ends of each pair of strips; and elastic contrast means for elastically contrasting oscillation of, and retain said L-shaped element in a position in which said strips form said rectangular frame, said machine comprising a supporting element fixed on said platform, said elastic contrast element including springs which are interposed between the abutments that form said L-shaped element and said supporting element and act on said abutments with an equal and mutually opposite action.

4. The machine of claim 3, wherein said abutments that form said L-shaped element gradually diverge from a vertex of said L-shaped element.

5. The machine of claim 4, comprising a connection spring for connecting the vertex of said L-shaped element to said supporting element.

6. The machine of claim 4, comprising a link for articulately coupling the vertex of said L-shaped element to said supporting element.

* * * * *